Sept. 25, 1962 R. F. SANKUER ET AL 3,055,770

THIN MAGNETIC FILMS

Filed Dec. 23, 1960 2 Sheets-Sheet 1

INVENTORS
JACOB RISEMAN
RAYMOND F. SANKUER

BY Roger B. Smith
ATTORNEY

Sept. 25, 1962 R. F. SANKUER ET AL 3,055,770

THIN MAGNETIC FILMS

Filed Dec. 23, 1960 2 Sheets-Sheet 2

United States Patent Office 3,055,770

Patented Sept. 25, 1962

3,055,770

THIN MAGNETIC FILMS

Raymond F. Sankuer and Jacob Riseman, Poughkeepsie, N.Y., assignors to International Business Machines Corporation, New York, N.Y., a corporation of New York Filed Dec. 23, 1960, Ser. No. 78,032

8 Claims. (Cl. 117—71)

The present invention generally to the manufacture of thin magnetic films, and more particularly to means for improving the magnetic properties thereof.

Recent investigations have revealed that certain thin metal alloy films, for example, NiFe films, have magnetic properties which make them useful in computer or other data handling circuitry. In particular, these films exhibit the generally rectangular hysteresis loop characteristics which have been found useful in adapting magnetic elements for data storage and logical switching applications. In the investigation of magnetic films, however, it has been found that considerable variations in magnetic properties exist in films supported upon substrates of diverse materials. It has also been found that thin film devices often have relatively slow switching (magnetic polarization reversal) speeds when exposed to switching fields which produce magnetization reversal by domain wall motion. These non-uniformities and low switching speeds severely limit the usefulness of magnetic films in present day equipment.

Accordingly, it is an object of this invention to provide magnetic films having improved magnetic characteristics.

It is also an object of this invention to improve the uniformity of the magnetic properties of films which are supported upon various substrates.

A further object of the invention is to provide means for isolating the magnetic properties of thin magnetic films from the influence of the surface characteristics of underlying substrates.

Investigation of the effects described above has revealed that the topographical characteristics of the surface upon which a magnetic film is supported exert a substantial influence upon the properties of the film. More specifically, it has been shown that within certain limits the speed of magnetization reversal occurring by domain wall motion in a metal alloy film is proportional to the surface roughness of the supporting substrate. It is believed that minute surface irregularities on the substrate create a great many strain points in the overlying film which provide more favorable nucleation sites for domain growth than are present in a film supported on a smooth surface.

The present invention takes advantage of this fact by providing means for treating any substrate to produce a surface having topographical characteristics which provide improved magnetic characteristics in a magnetic film plated or otherwise deposited thereon. More specifically, this invention contemplates the provision on any substrate of a layer or coating of a varnish, adhesive or other material which has particles of granular material suspended therein. The granular material creates controlled and uniform surface irregularities which provide the overlying magnetic film with the desired properties.

The present invention enjoys advantages in that the desired surface characteristics may be provided on any substrate material; therefore, the substrate may be selected entirely upon the basis of its cost, strength, etc., without regard to particular surface characteristics. Moreover, devices which require one or more intermediate layers, for example, printed wiring, etc., between the substrate and the film may be accommodated since the controlled surface coating may be applied over the intermediate layers. In fact, the controlled surface coating may serve as an insulation layer between the film and electrical circuitry therebeneath.

The foregoing and other objects, features and advantages of the invention will be apparent from the following more particular description of preferred embodiments of the invention, as illustrated in the accompanying drawings.

Figure 6A:
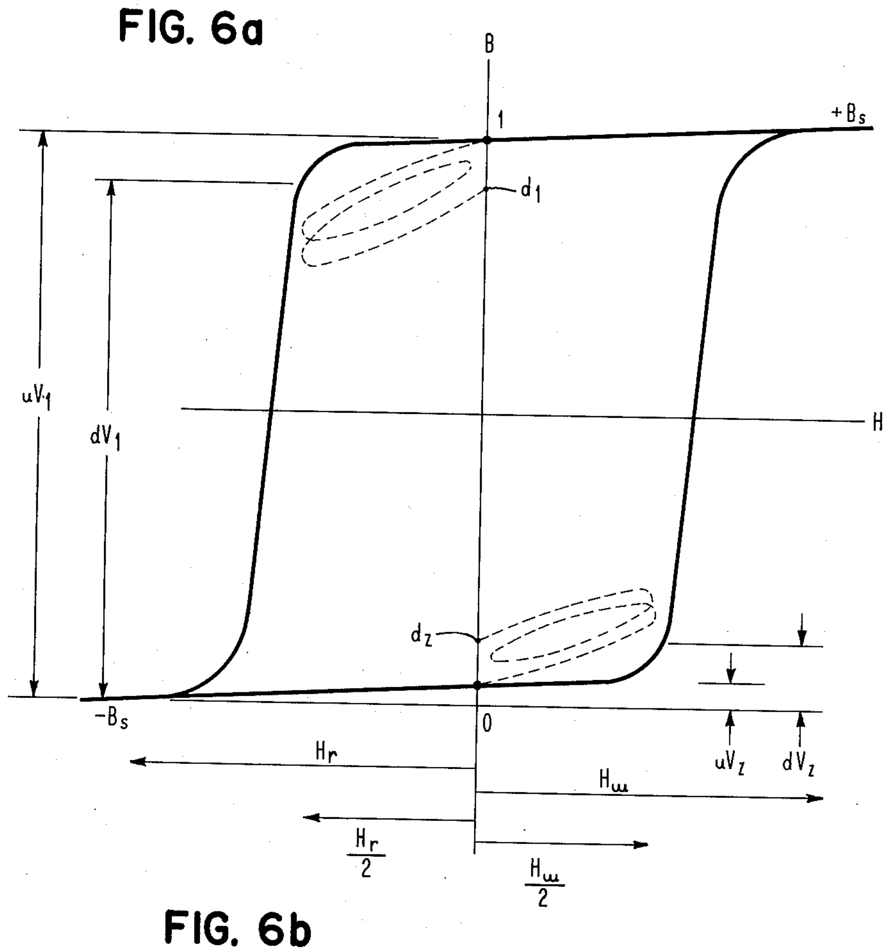
Figure 6B:
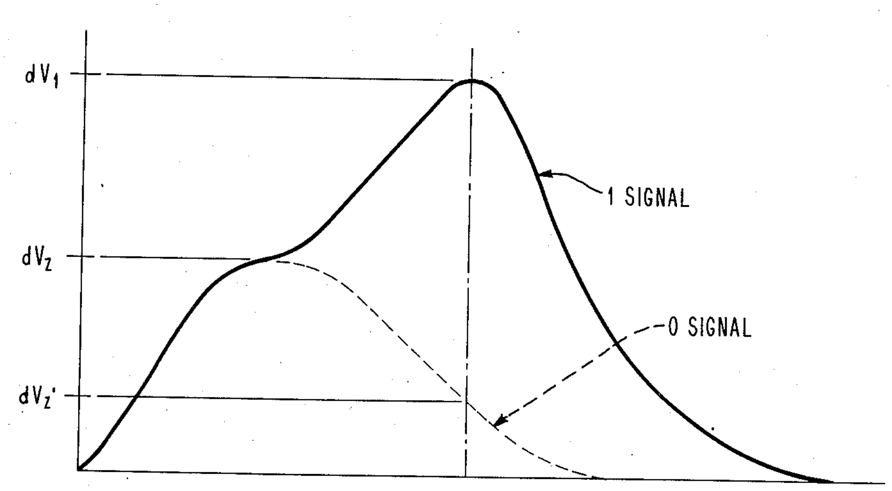

FIGURE 6*a* is a hysteresis curve typical of those exhibited by magnetic films of the type to which this invention pertains; and FIGURE 6*b* is a chart showing typical output voltages induced in a winding coupled to a thin film device during operation thereof.

Figure 1:
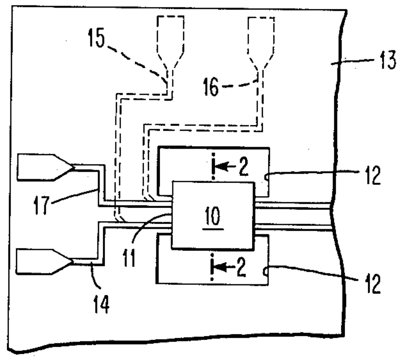
FIGURE 1 is an elevational view of a magnetic film device manufactured in accordance with the present invention.
Figure 2:
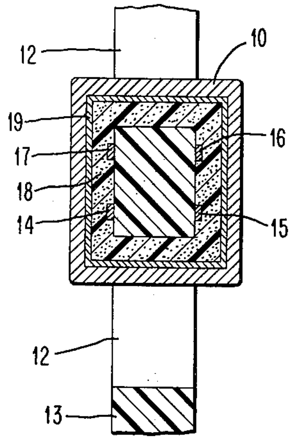
FIGURE 2 is an enlarged fragmentary sectional view taken along the line 2—2 of FIGURE 1.

In FIGURES 1 and 2 of the drawings there is shown a memory element of a type to which the present invention is applicable. This element is similar to the structure described in the copending application Serial No. 814,772, filed May 21, 1959, by K. F. Greene et al., and assigned to the assignee hereof. It comprises a tubular thin film 10 of magnetic metal alloy such as NiFe, supported on a web 11 between a pair of apertures 12 cut in a supporting board 13. The film 10 exhibits a hysteresis loop similar to that shown in FIGURE 6*a*, and is adapted to be operated in the conventional coincident current mode in the same manner as the now well-known ferrite memory cores. To this end, three driving conductors 14, 15, and 16, which may be parts of X, Y, and Z selection drive lines, are supported on the web 11 beneath the film. A fourth conductor 17 is provided for sensing changes in the magnetic state of the film element 10, produced by combinational energizations of the drawings conductors.

The conductors 14, 15, 16, and 17 are obtained on the opposite faces of the supporting board 10 by conventional printed circuit techniques. While they may be arranged in any desirable manner, FIGURES 1 and 2 illustrate conductors 14 and 17 printed on one face and conductors 15 and 16 printed upon the other. The film 10 is insulated from the conductors 14—17 by a coating 18 of insulating material which may be any suitable varnish, lacquer, plastic, etc. The film 10 is deposited by any suitable process, for example, electroplating, over the insulating coating. Where the process of electroplating is employed, a thin conductive film 19 of copper or the like is deposited over the coating 18 to serve as the receiving cathode during plating.

Figure 3:
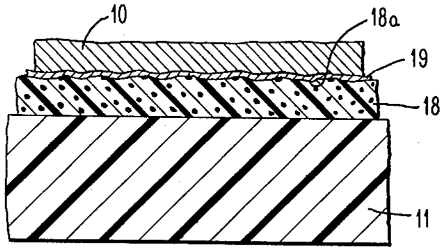
FIGURE 3 is an enlarged fragmentary sectional view diagrammatically illustrating a coating prepared in accordance with the present invention.

In accordance with the present invention, the magnetic characteristics of the film element 10 are improved by employing as the insulating coating 18 a varnish, lacquer, etc. which has suspended therein a plurality of particles of granular material. As illustrated diagrammatically in FIGURE 3, these particles produce minute uniformly distributed irregularities in the surface **18*a* of the coating 18. These irregularities affect the overlying film 10** in the manner hereinbefore described, thereby increasing the speed with which magnetization of the film may be reversed.

Figure 4:
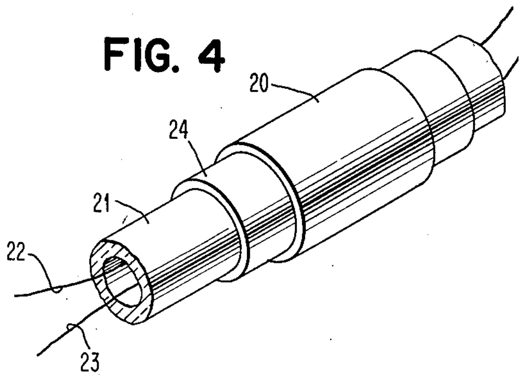
FIGURES 4 and 5 are perspective views illustrating further embodiments of magnetic film elements manufactured in accordance with this invention.
Figure 5:
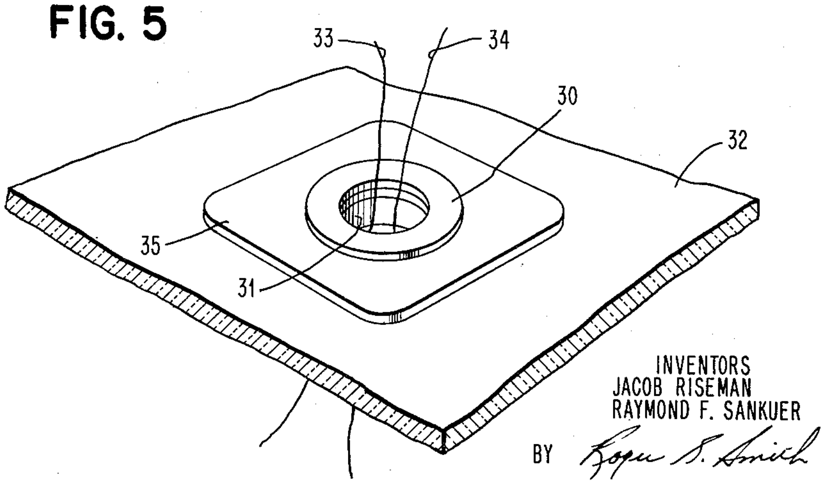

FIGURES 4 and 5 show other non-limiting examples of magnetic film elements to which this invention is applicable. In FIGURE 4 there is shown a film 20 supported upon a smooth glass tube 21. Current carrying conductors such as those indicated at 22 and 23 are threaded through the tube 21 to excite the film and to sense changes in its magnetic state. In this embodiment, no insulating coating is required since no conductors are plated on the tube. An undercoating 24, prepared in accordance with this invention, is provided between the tube 21 and the film 20, to improve the properties of the film and to isolate them from influence of the surface characteristics of the glass substrate. If the process by which the film is deposited requires an adhesive undercoating for bonding, the coating 24 may serve this purpose also.

In FIGURE 5, there is shown a magnetic film element 30 in the form of a flat disk plated around an aperture 31 in a substrate 32. Conductors 33 and 34 pass through the aperture to manipulate the magnetic condition of the film. As in the previous examples, a controlled surface undercoating 35 is provided between the substrate and the film to improve the properties of the film.

A coating 18, 24, or 35 having controlled surface characteristics is prepared according to this invention by adding to a resinous binder such as a varnish, lacquer, or other adhesive material, a predetermined quantity of inert granular material. The granules becomes suspended in the coating and give it the irregular or textured surface which performs the function described earlier herein.

It has been found that the amount of granular material added to the coating may vary over a fairly wide range and still produce the desired surface characteristics. The amount added must be great enough to produce an appreciable texture in the surface but not so great as to tend toward agglomeration. Some thought must also be given to the maintenance of a consistency in the coating material which will permit uniform application to the substrate. It has been experimentally determined that amounts of granular material between about 10% and 40% by weight of the total solids content of the coating material produce the most improvement of the magnetic properties of films deposited thereon. Films deposited upon coating containing granular material in amounts less than 10% by weight of the total solids content show some improvement in characteristics but not the marked improvement observed when the loading of the coating is between 10% and 40%. Amounts of granular material above 40% show agglomeration tendencies which destroy the uniformity of the coating.

The particular granular material employed does not seem to be critical. Any material which will remain stable in the coating without agglomerating or dissolving or otherwise reacting is sufficient. Materials such as $SiO_2$, $TiO_2$, graphite and vermiculite have all proved satisfactory.

Particle size and geometry are important considerations, although both may vary over a wide range. Particle sizes of 0.015 micron have been observed to have slight effects upon the properties of films deposited thereover, and larger particles produce substantial improvements. Particle sizes much in excess of 50 microns, however, appear too large to produce the texture found most beneficial. Particles of this size tend to settle in the coating and do not provide uniform surface characteristics. As for particle shape, it may be generally stated that particles whose three dimensions (length, width and height) are of the same order of magnitude are to be desired. Roughly, spheroidal or cubical particles such as silica have been shown to be well adapted for the purpose. The platelet-like particles of vermiculite, however, have also proved satisfactory.

The particular composition of the coating material to which the granular material is added is not critical. In some forms of manufacture of thin metallic films, it is necessary to apply a preparatory undercoating to the substrate prior to the deposition operation. A resin and solvent system, such as Armstrong N178 adhesive, is commonly used for this purpose. It has been found that this material is very satisfactory as the controlled surface coating material, and that any of the granular materials mentioned hereinbefore may be added thereto. Varnishes and lacquers of the type commonly employed for insulation purposes in the electrical arts are also satisfactory.

Thin magnetic films of the type having generally rectangular hysteresis loops manufactured in accordance with this invention have been observed to have significantly better switching characteristics and to produce generally higher output voltages upon switching. In addition, they have been found to be somewhat less disturb-sensitive than similar films manufactured in the conventional manner.

The term "switching characteristics" as employed herein is intended to refer to the speed of magnetization reversal of a film driven from one magnetic remanence state to the other. It is common practice to designate this speed in terms of switching time and it will be so designated herein. The switching time may be represented by the symbol $Ts$ and will refer to the time in microseconds elapsing during a complete reversal of magnetization.

The output voltage produced in a winding magnetically coupling a film when a driving field is applied varies substantially in accordance with the magnetic history of the film. FIGURE 6*a* shows a hysteresis loop characteristic of those exhibited by magnetic films of the type to which this invention applies. It will be observed that the loop is relatively square and that the magnetic remanence points 1 and 0 are widely separated. A film which has been placed in the positive remanence state (point 1 on the loop) will, when subjected to a field having the sense and magnitude of the arrow $Hr$, traverse its loop from point 1 to the negative saturation point $-Bs$ changing the amount of flux indicated by the dimension $uV_1$. The output voltage induced by this change of flux is often referred to as the "undisturbed 1 voltage" and is represented by the symbol $uV_1$. If the film, originally residing in the 1 state, is subjected to a field having the sense and magnitude of the arrow $$\frac{H_r}{2}$$

it will traverse a minor loop similar to the dotted path at the upper portion of the hysteresis loop and attain a positive remanence state somewhat lower than point 1. The remanence state will continue to move down on the vertical axis in response to repeated applications of $$\frac{H_r}{2}$$

until a stable limiting point $d_1$ is reached. The point $d_1$ is usually referred to as the "disturbed 1" state. When a full $H_r$ field is applied to a film in this state, the change in flux, indicated by dimension $dV_1$, is smaller than the change $uV_1$ and correspondingly the output voltage, known as a "disturbed 1 voltage" and referred to by the symbol $dV_1$, is also smaller.

If the film is in the negative remanence state (at point 0) and a field $H_r$ is applied, a flux change equal to the dimension $uV_z$ is produced and an "undisturbed 0 voltage" is induced in the output winding. If the film, originally in the 0 state is subjected to a plurality of disturb fields of the sense and magnitude indicated by the arrow $$\frac{H_w}{2}$$

it will move its remanence state to the point $d_z$. A field $H_r$ applied after these disturbances will cause a flux change equal to the dimension $dV_z$ and will induce a "disturbed 0 voltage" in the output winding.

Those skilled in the art will appreciate that the relative magnitudes of the various output voltages just described, together with the switching time $Ts$, constitute a fairly accurate measure of the magnetic properties of a film and of its capabilities as a memory or logic element in an electronic data handling device. It may be generally stated that films having high ratios of $dV_1/dV_{z'}$ ($dV_{z'}$ being the magnitude of $dV_z$ at the time $dV_1$ reaches its peak value, as shown in FIGURE 6*b*), and low switching times, are the most desirable for memory or logic uses in data handling equipment.

To illustrate the improvements obtained with the present invention, several specific examples are set forth below:

*Example 1*

A length of glass tubing approximately 80 mils outside diameter was chemically cleaned and dipped into a solution consisting of 1 part Armstrong N178 adhesive and 320 parts methylethyl ketone. The tube was then oven dried at 150° F. for 20 minutes to set the adhesive.

Following the coating operation, the tube was copper metallized, resist coated and electroplated with NiFe film. The electroplating operation was carried out in accordance with well known procedures and it is not believed necessary to describe it in detail. A magnetic orienting field was provided during the electroplating period, which was 12 minutes, by passing 5 amperes of direct current through a conductor threaded through the tube.

The completed magnetic film was subjected to tests to determine its magnetic properties. The following figures represent the test results:

$uV_1$=20.0 millivolts
$dV_1$=7.5 millivolts
$dV_z$=14.0 millivolts
$dV_{z'}$=4.5 millivolts
$Ts$=20.0 microseconds

*Example 2*

An adhesive coating solution was prepared by adding enough silica to a mixture of Armstrong N178 adhesive and methylethyl ketone to constitute 40% by weight of the total solids content of the mixture. The adhesive was observed to have an initial solids content of approximately 30% by weight. The average particle size of the silica was observed to be approximately 3.3 microns diameter. A length of glass tubing similar to that of Example 1 was cleaned, coated with the adhesive and silica mixture and oven dried as before. The tube was then metallized and plated as in the first example. Tests on this sample produced the following results:

$uV_1$=47.0 millivolts
$dV_1$=30.0 millivolts
$dV_z$=36.0 millivolts
$dV_{z'}$=13.0 millivolts
$Ts$=1.6 microseconds

*Example 3*

An adhesive coating solution was prepared as in Example 2 except that the silica content was lowered to 10% by weight of the total solids. Silica having an average particle size of about 3.3 microns was again used. A glass tube similar to those of Examples 1 and 2 was cleaned, coated, dried and plated in the same manner as in the other examples. Test results for this sample are set forth below:

$uV_1$=46 millivolts
$dV_1$=31 millivolts
$dV_z$=28 millivolts
$dV_{z'}$=8 millivolts
$Ts$=1.9 microseconds

*Example 4*

An adhesive coating solution was prepared as in the former examples except that the silica content was adjusted to 20% by weight of the total solids content. A glass tube was cleaned, coated, dried and plated as before. This sample exhibited the following characteristics:

$uV_1$=48 millivolts
$dV_1$=31 millivolts
$dV_z$=33 millivolts
$dV_{z'}$=11 millivolts
$Ts$=2.2 microseconds

*Example 5*

A coating solution was prepared using Horvel 902 air drying varnish. Enough silica (3.3 micron average particle size) was added to comprise 30% by weight of the total solids content. A glass tube, similar to those used in the other examples, was cleaned, coated with the silica-varnish solution, dried and plated as before. The test results for this sample were:

$uV_1$=54 millivolts
$dV_1$=34 millivolts
$dV_z$=34 millivolts
$dV_{z'}$=12 millivolts
$Ts$=1.7 microseconds The test results given above show that films plated in accordance with this invention (Examples 2–5) exhibited switching times as low as one tenth the switching time of a film plated in accordance with prior art teachings. The output voltages $uV_1$ and $dV_1$ of these films are also somewhat improved and the ratios of $dV_1/dV_{z'}$ are at least comparable.

While all examples relate to electroplated NiFe films, it will be apparent that the teachings hereof are applicable to films deposited on substrates by other processes, e.g., vacuum deposition, electrophoresis, etc., as well. Moreover, the invention is not intended to be limited to NiFe films, but is applicable to other magnetic metal alloys, for example nickel-cobalt as well.

The films mentioned herein have been characterized as "thin" magnetic films. It will be understood that the actual thickness of specific examples of films manufactured in accordance with this invention may vary considerably depending upon the properties, e.g. output voltage magnitude, etc. desired. Films the thicknesses of which vary as much as from 10,000 angstroms to 240,000 angstroms are all susceptible to improvement in accordance with this invention.

While the invention has been particularly shown and described with reference to preferred embodiments thereof, it will be understood by those skilled in the art that various changes in form and details may be made therein without departing from the spirit and scope of the invention.

What is claimed is:

1. As an article of manufacture, a magnetic device of the rectangular hysteresis loop type and having improved magnetic properties comprising in combination, a supporting substrate, a resinous undercoating supported on the substrate, said undercoating including therein a multiplicity of discrete particles of granular material some of which project above the surface of the coating and create a surface having uniform and controlled surface irregularities, said granular material having an average particle size of less than about 50 microns and a concentration of less than about 40 percent by weight of the total solids content of the undercoating, and a continuous thin magnetic metallic film having a thickness of between about 10,000 and 240,000 angstroms supported upon said undercoating.

2. The article as defined in claim 1 wherein the granular material has an average particle size between 0.02 microns and 50 microns.

3. The article as defined in claim 1 wherein the granular material has a particle size between about 1 micron and 10 microns.

4. The article as defined in claim 1 wherein the coating comprises resinous binder and wherein the inert granular material comprises between 5% and 40% by weight of the total solids content of the coating.

5. The article defined in claim 4 wherein at least part of said granular material comprises silica.

6. A method of manufacturing a magnetic storage element of the rectangular hysteresis loop type having improved magnetic properties comprising first applying to a supporting substrate a coating which comprises an intimate mixture of a resinous binder and a plurality of discrete particles of granular material, said granular material having an average particle size of less than 50 microns and a concentration of less than 40% by weight of the total solids content of the binder, said particles imparting to the coating a surface of uniform and controlled irregularity, and then obtaining on the said irregular surface a magnetic metallic film of a thickness between about 10,000 angstroms and 240,000 angstroms.

7. The method defined in claim 6 wherein the granular material has an average particle size of between 1 and 10 microns.

8. The method of claim 7 wherein the granular material comprises silica.

References Cited in the file of this patent

UNITED STATES PATENTS

| | | |
|---|---|---|
| 2,264,152 | Rowland | Nov. 25, 1941 |
| 2,626,223 | Sattler et al. | Jan. 20, 1953 |
| 2,810,660 | Carpenter | Oct. 22, 1957 |
| 2,819,186 | Franck | Jan. 7, 1958 |
| 3,019,125 | Eggenberger et al. | Jan. 30, 1962 |

OTHER REFERENCES

Tsu: IBM Technical Disclosure Bulletin, vol. 2, No. 3, p. 36, October 1959.